United States Patent
Obenhuber et al.

Patent Number: 6,144,638
Date of Patent: *Nov. 7, 2000

[54] MULTI-TENANT UNIT

[75] Inventors: Thomas Obenhuber, San Francisco, Calif.; Rodney L. Joffe, Phoenix, Ariz.

[73] Assignee: BBN Corporation, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/853,862

[22] Filed: May 9, 1997

Related U.S. Application Data

[60] Provisional application No. 60/019,089, May 14, 1996.

[51] Int. Cl.[7] .................................................. H04L 12/56
[52] U.S. Cl. ............................................ 370/231; 370/398
[58] Field of Search ..................................... 370/230, 231, 370/235, 398, 423, 468, 537, 538, 412, 413, 414, 415, 416, 417, 418, 232, 233, 234, 252, 253

[56] References Cited

U.S. PATENT DOCUMENTS

| | | | |
|---|---|---|---|
| 4,769,810 | 9/1988 | Eckberg, Jr. et al. | 370/232 |
| 5,231,633 | 7/1993 | Hluchyj et al. | 370/429 |
| 5,463,620 | 10/1995 | Sriram | 370/412 |
| 5,519,689 | 5/1996 | Kim . | |
| 5,673,254 | 9/1997 | Crayford | 370/231 |
| 5,706,279 | 1/1998 | Teraslinna | 370/232 |
| 5,706,507 | 1/1998 | Schloss | 395/615 |
| 5,712,968 | 1/1998 | Nakayama et al. | 395/182.02 |
| 5,768,257 | 6/1998 | Khacherian et al. | 370/229 |
| 5,838,681 | 11/1998 | Bonomi et al. | 370/395 |
| 5,953,317 | 8/1999 | Ogasawara et al. | 370/232 |
| 5,960,177 | 8/1999 | Tanno | 395/200.59 |

*Primary Examiner*—Douglas W. Olms
*Assistant Examiner*—Kenneth Vanderpuye
*Attorney, Agent, or Firm*—Leonard Charles Suchyta; Floyd E. Anderson

[57] ABSTRACT

Systems and methods for providing multiple users with access to a public network like the Internet are provided. A single high bandwidth connection (e.g., fast Ethernet) allows the users to communicate with the public network. Each user is allocated a specific bandwidth and can freely communicate with the public network up to the allocated bandwidth. Additionally, the invention may be remotely configured to change bandwidth allocations.

16 Claims, 12 Drawing Sheets

MULTI-TENANT UNIT

This application claims priority from U.S. Provisional Patent Application Ser. No. 60/019,089, filed May 14, 1996, naming as inventors Thomas Obenhuber and Rodney Joffe, and assigned to the assignee of the instant application. U.S. Provisional Patent Application Ser. No. 60/019,089 is incorporated by reference herein in its entirety for all purposes.

BACKGROUND OF THE INVENTION

The present invention relates to computer networking systems and, more particularly, to systems and methods of providing Internet access to multiple users at a single location.

The Internet is a collection of thousands of computer networks around the globe. Internet usage has grown exponentially since 1993, mainly due to the world wide web (Web) and its electronic mail (e-mail) and web page capabilities. This interconnection of computers is possible because the Internet has adopted a communication standard (Transmission Control Protocol/Internet Protocol or TCP/IP) which allows computers with different operating systems to communicate with each other over a network of networks (an "internetwork").

By one estimation, over 8 million computers currently attach to the Internet. An estimated 40 million users worldwide access these computers ("hosts").

Corporations and private users increasingly demand easy, cost-effective, and high-speed (e.g., greater than 1 megabits per second or Mbps) access to public interoperable networks such as the Internet. Around the world, the demand for a technical infrastructure for building private networks on top of public networks also is increasing.

As the number of users on the Internet increases, so too do the users grow more sophisticated. Users are demanding greater bandwidth to support this sophistication.

In conventional systems a user might use several different suppliers and components to achieve connectivity and security. The user then has to change equipment and software protocols during his migration from a lower bandwidth (e.g., 56 kilobits per second or kbps) to a higher bandwidth (e.g., 1 Mbps or higher).

Accordingly, there is a need for a substantially simplified infrastructure to access public networks with a reduced number of components, a reduced number of software protocols, enhanced management capabilities for network components, and secure access to the public network.

SUMMARY OF THE INVENTION

The present invention provides systems and methods for providing multiple users with access to a public network like the Internet. A single high-bandwidth connection (e.g., fast Ethernet) allows the multiple users to communicate with the public network. Each user is allocated a specific bandwidth, and the user is able to freely communicate with the public network up to the allocated bandwidth. Additionally, the invention may be remotely configured to change bandwidth allocations.

In a preferred embodiment, the present invention provides an apparatus for communicating information packets between each of a plurality of ports (referred to as "user ports") and an additional port (referred to as the "network port"). The apparatus includes a switch for establishing communication paths between each of the user ports and the network port; storage for configuration information regarding the user ports; and a controller, responsive to the configuration information for a given user port, for limiting the flow of information packets between the given user port and the network port.

Additionally, the present invention provides a method for distributing data between a network port and multiple user ports. The method includes for each of the user ports, storing configuration information indicating the data bandwidth allocated to the port; receiving a request to send data between the network port and a selected user port; determining if the current data bandwidth of the selected user port exceeds the allocated data bandwidth; and sending the data between the network port and the selected user port if the current data bandwidth does not exceed the allocated data bandwidth.

Also, the present invention provides a method of establishing respective network connections between a wide area network (WAN) and each of multiple tenant sites at a single location to allow information packets to be communicated between each tenant site and the WAN. The method includes providing a central switching apparatus at the location, including a plurality of tenant ports and an additional network port; coupling the WAN to the network port; coupling at least one computer or a local area network (LAN) at each tenant site to a respective tenant port; and establishing, with the central switching apparatus, communication paths between each tenant port and the network port to provide each tenant with access to the WAN.

Further aspects and features of the present invention will become readily apparent to one of ordinary skill in the art on reading the background above and the description below.

DETAILED DESCRIPTION OF SPECIFIC EMBODIMENTS

The following description uses the Internet as an example to describe in detail the current art of public network access. The invention, however, is not restricted to the Internet and is applicable to other commercially or publicly available networks.

Introduction

Internet access can be gained conventionally through two methods:

Dial-up service through an access provider such as AOL® or Compuserve® geared to the individual occasional user. However, the low capacity of such a dial-up service is unsuitable for the typical heavy corporate use. In addition, it is an expensive solution when used heavily during business hours.

Dedicated line through an access provider geared to the corporate user. The entry cost for such service can be very high, and access via a dedicated line is a complicated procedure involving multiple hardware and service suppliers.

Figure 1A:
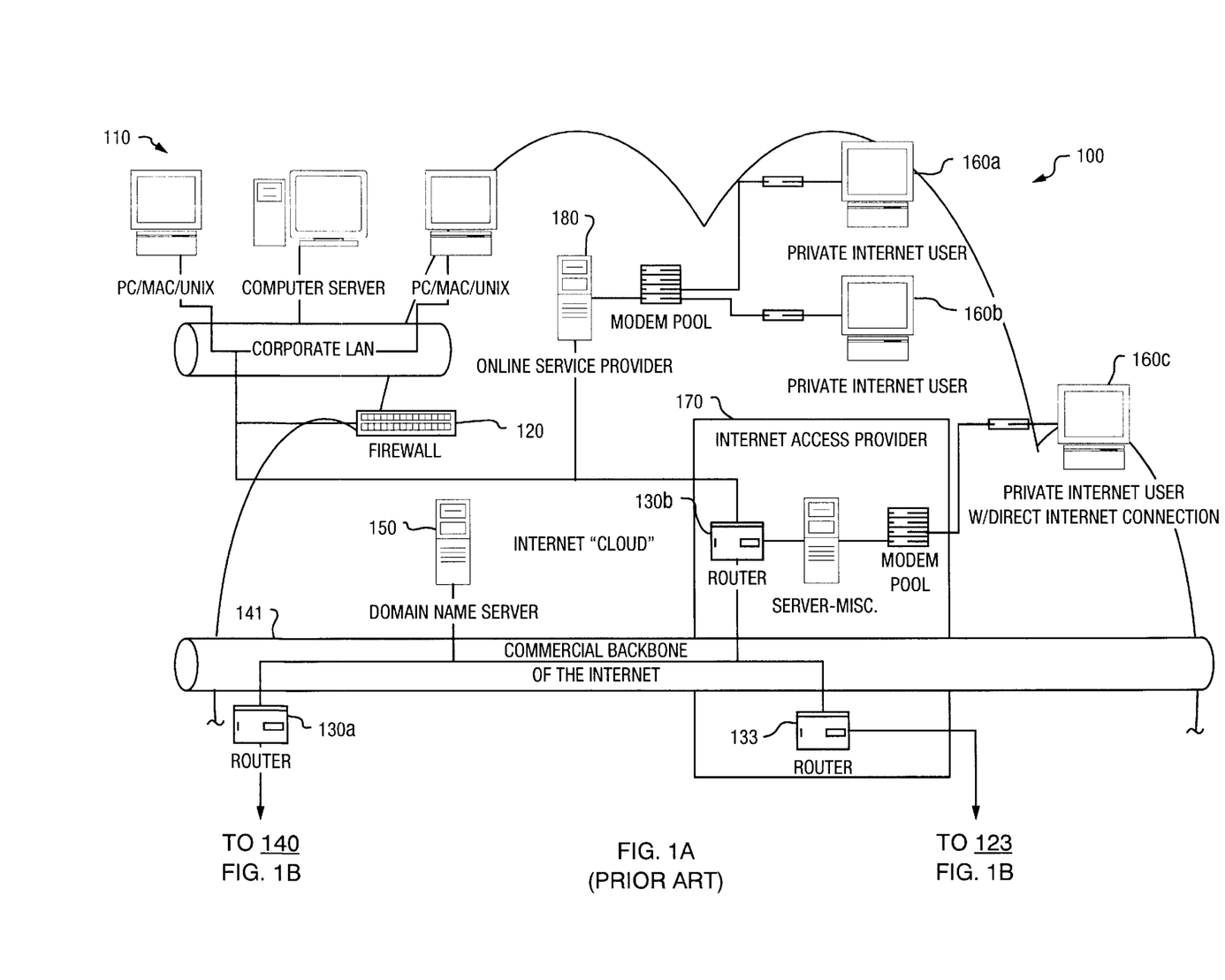
FIG. 1 shows several hardware components and connection mechanisms to access an internetwork.
Figure 1B:
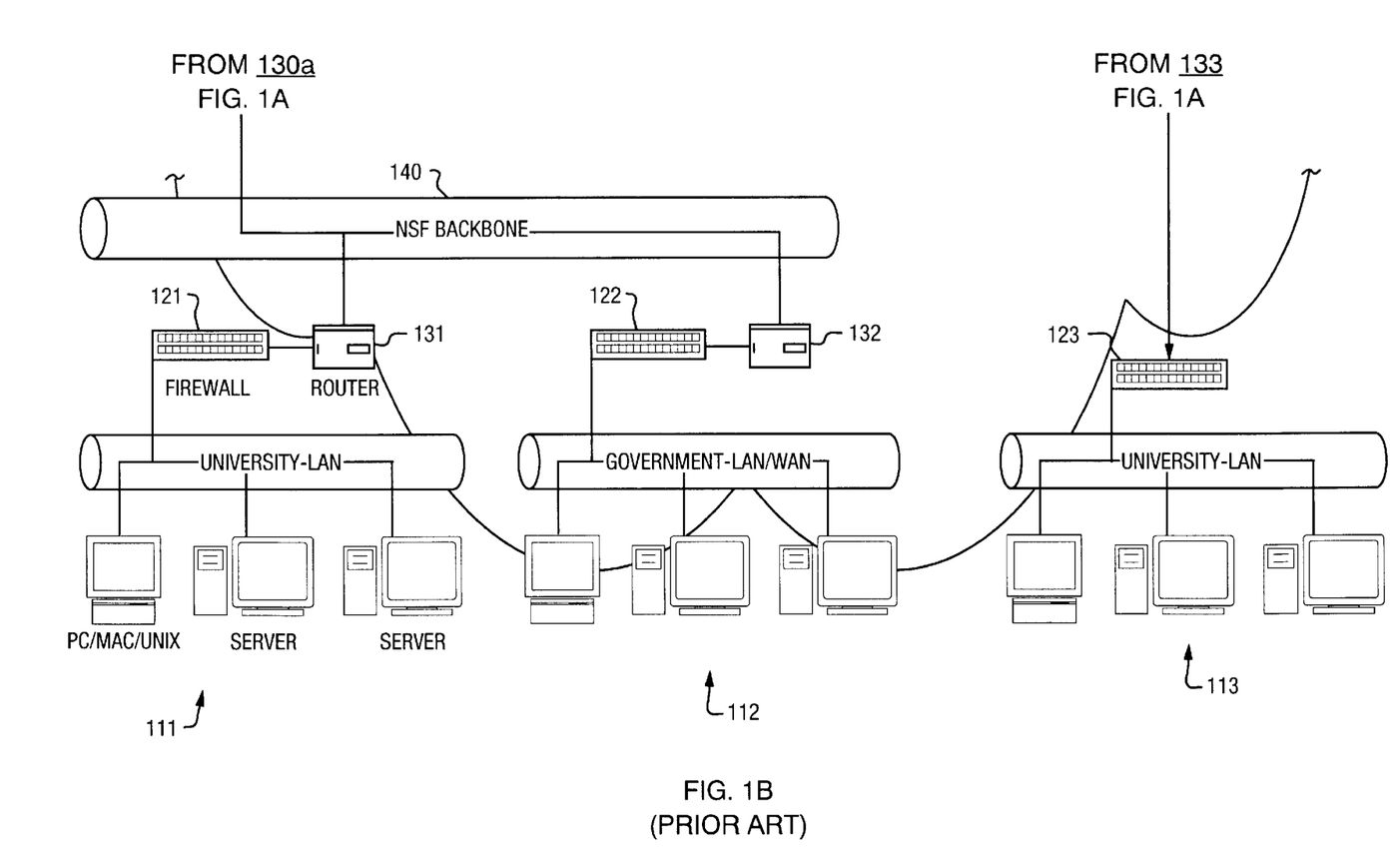

Hardware and software components are needed to make a network functional. FIG. 1 shows several hardware components and connection mechanisms for accessing the Internet. FIG. 1 shows an internetwork 100 including LAN's or WAN's 110–113. Each LAN or WAN 110–113 connects by means of a firewall 120–123 and router 130–133 to a sub-backbone 140 or the main backbone 141 of the internetwork 100. The routers 130–133 and a domain name server 150 provide services according to well-known protocols. A private user 160 can access the internetwork through an on-line service provider 170 or an internetwork access provider 180.

In addition to the hardware, several software components cooperate to make the internetwork 100 functional. Where the internetwork 100 employs the well-known OSI Network Layer Standard, seven layers of network software are present.

An Embodiment

The invention addresses a general problem related to the second group of access methods, the dedicated high-speed access. To connect to the Internet via such a dedicated line, a user can employ one of several methods, depending on speed requirements. He can start with a modem (Channel Service Unit/Digital Service Unit or CSU/DSU) for a 56 kbps dedicated line, switch to ISDN to upgrade modem and speed to 128 kbps, modify the modem to increase speed to T1 (1.2 Mbps) up to T3 (45 Mbps). Each change requires different modems and carrier lines. Independent of speed, the user has to coordinate several software protocol standards.

Figure 2A:
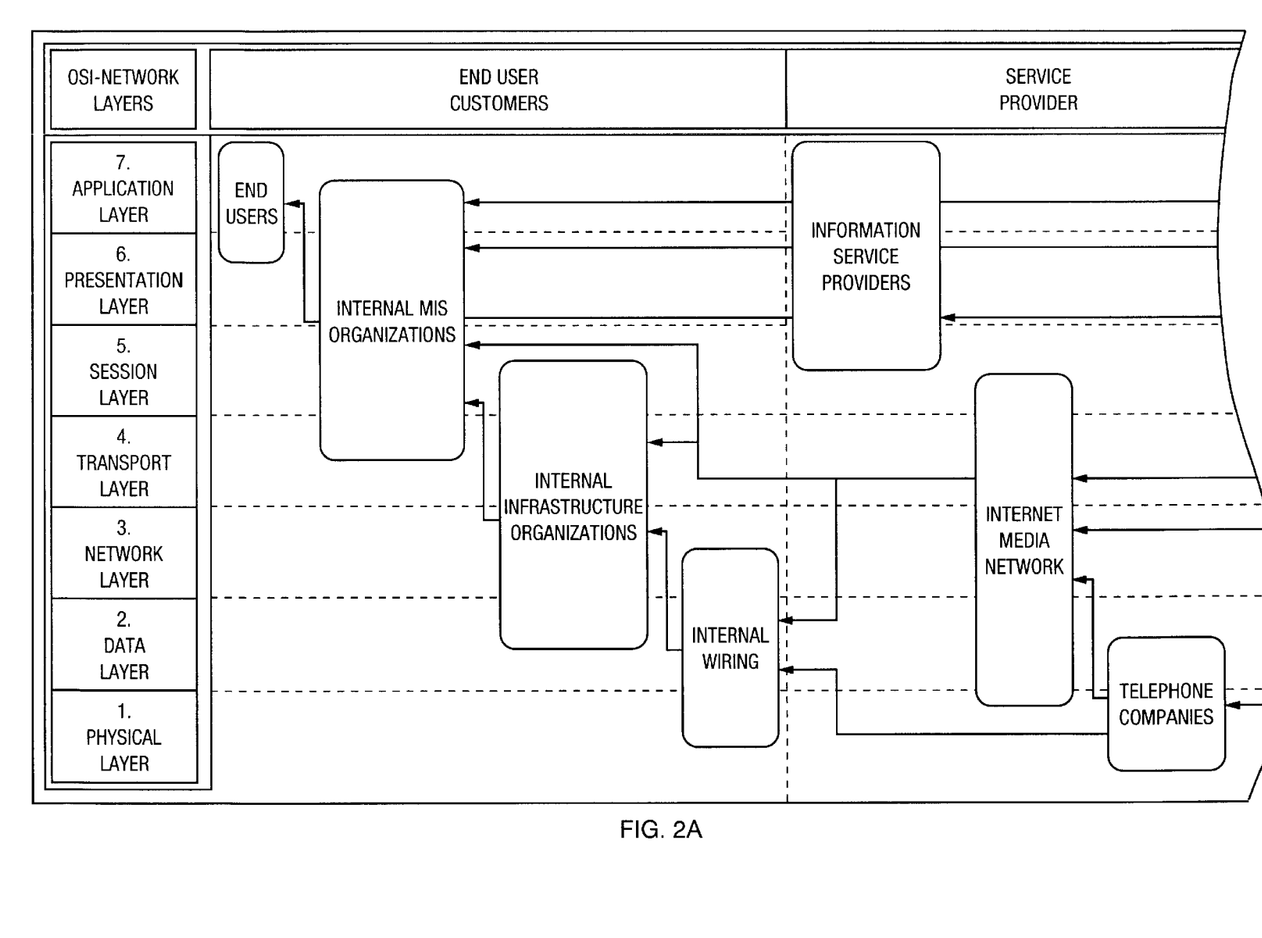
FIG. 2 shows the present invention combining several OSI network layers.
Figure 2B:
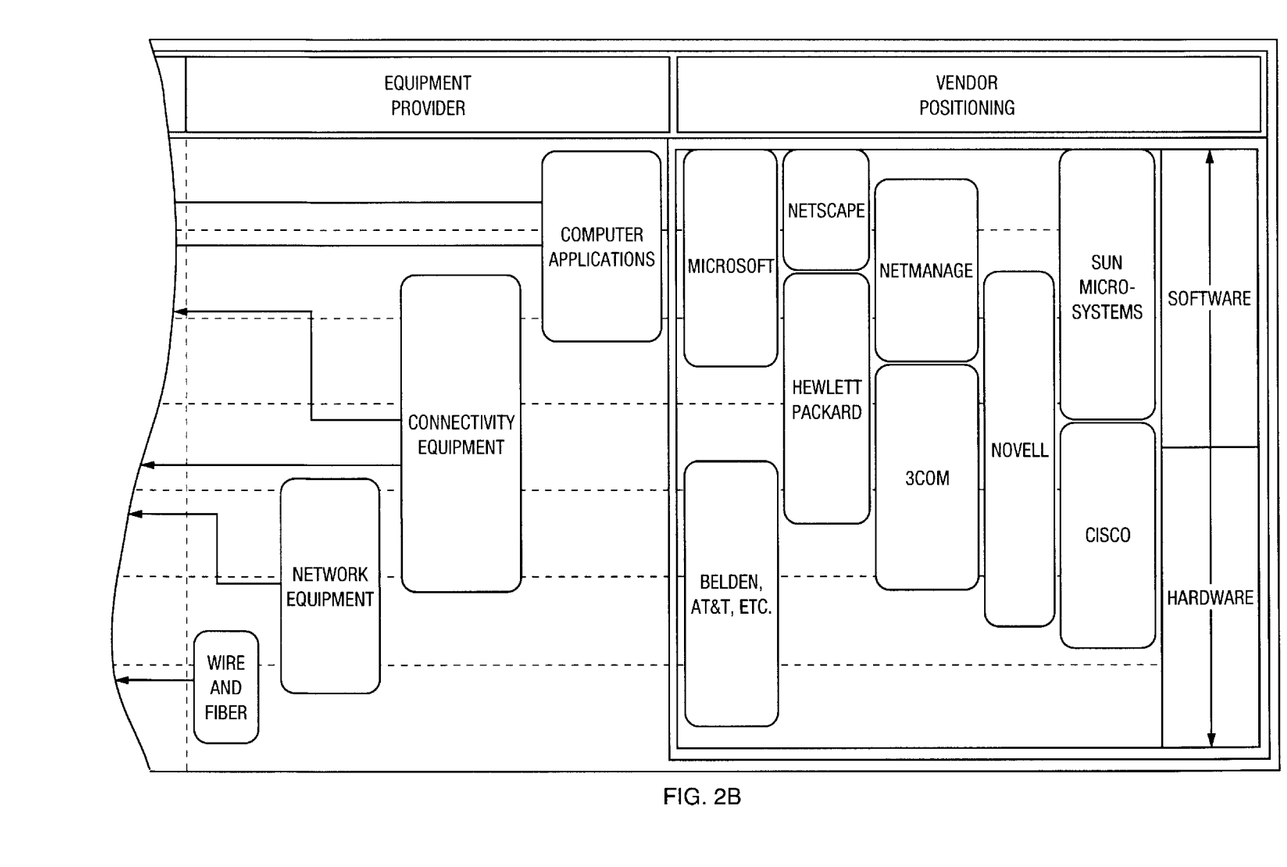
Figure 3:
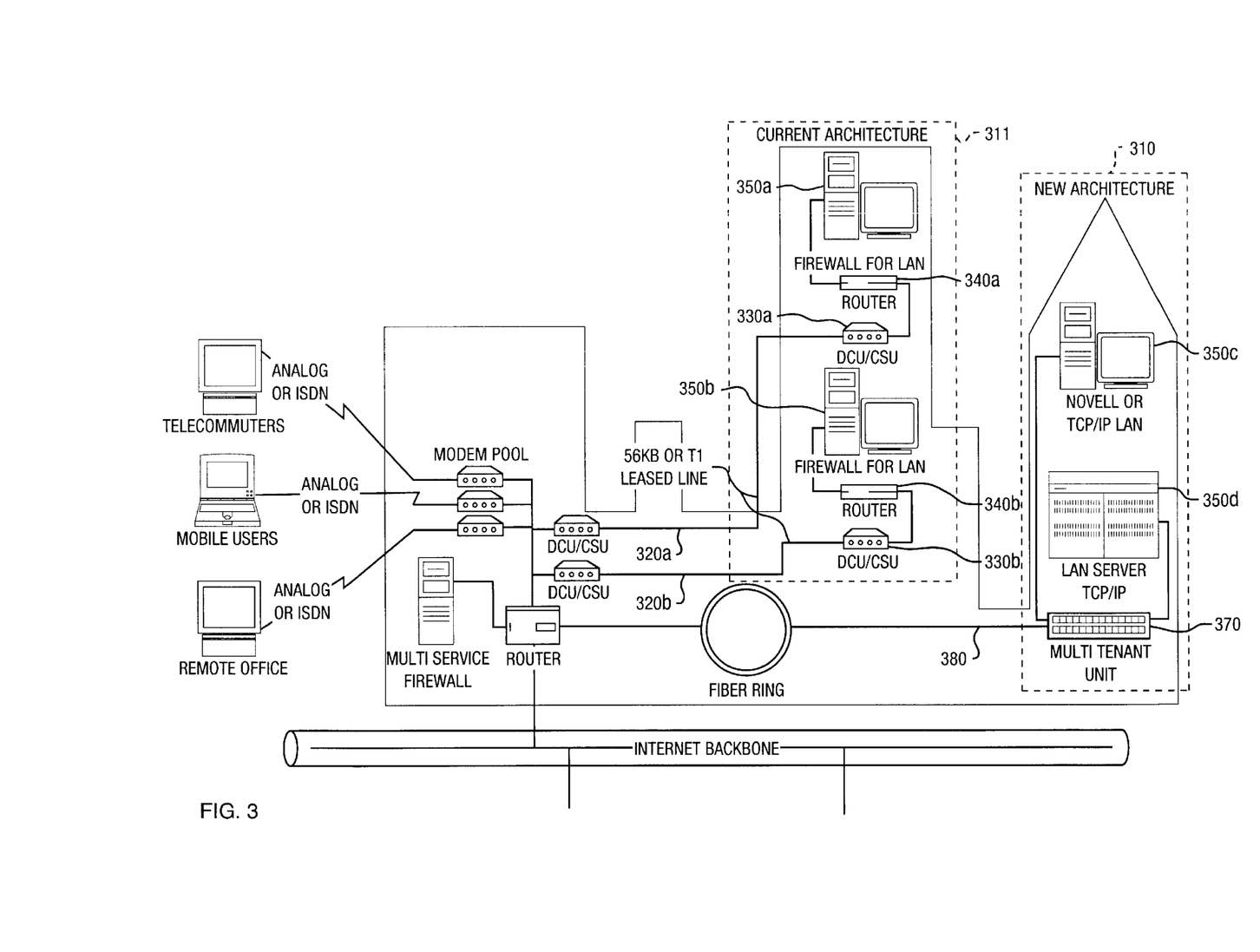
FIG. 3 shows differences in connection mechanisms between the invention and a conventional system.

FIG. 3 shows differences in connection mechanisms between an embodiment of the invention 310 and a conventional system 311. As shown, the components for the conventional approach may include the following:

OSI level 1&2 protocols (see FIG. 2);

a leased line 320 provided from one of the available carriers;

a CSU/DSU 330 at the end of the line 320, connected to a router 340;

the router 340;

an encryption engine or machine (not shown) at both sides of the line for secure transmission; and a firewall machine 350.

All this equipment is needed per user, typically corporate. Indeed, most of these units and services are from different suppliers and service organizations which complicates the installation as well as increases its cost and complexity for the corporate and private user.

The invention simplifies the access and reduces the cost. As shown in FIG. 3, an embodiment 370 of the invention (referred to as the Multi-Tenant Unit) and a communications line 380 together replace the conventional leased line 320, the CSU/DSU 330, the router 340, the encryption engine, the firewall machine 350 and the concomitant OSI protocols. The users 360c and 360d connect by means of the multi-tenant unit 370. (FIG. 2 shows an embodiment of the invention (denoted "Internet Media Network") combining several OSI network layers.)

Figure 4:
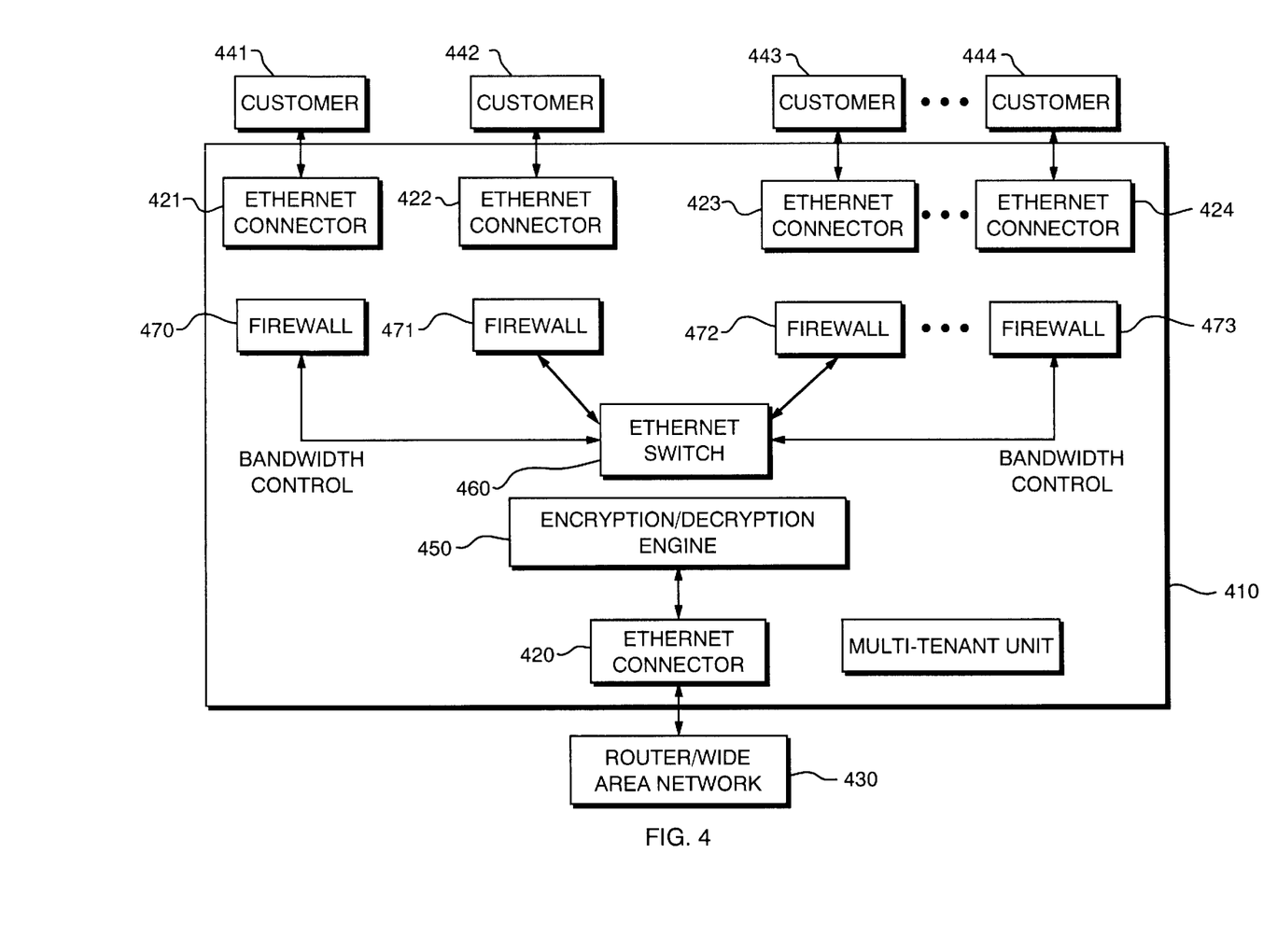
FIG. 4 illustrates a functional block diagram of an embodiment of the invention.

FIG. 4 illustrates a functional block diagram of an embodiment of the invention. Within the single box 410 labeled "Multi-Tenant Unit," ports 420–424 connect to a network 430 and multiple users 44–444. As shown, a network port 420 (an Ethernet connector) connects to the WAN 430 (e.g., the Internet). Additionally, multiple ports 421–424 (also Ethernet connectors) connect to respective multiple users 441–444. The users 441–444 may be stand-alone computers or LANs.

Within the box 410 is an encryption/decryption engine 450 for securing the transport of data. An Ethernet switch 460 directs packets (data) between the ports and includes bandwidth control for allocating the bandwidth among the users 441–444. Firewalls 470–473 provide security to respective users 441–444 individually. The following describes these elements in more detail.

The Connectors

In one embodiment, conventional connectors provide Ethernet-to-fiber cable transceiver service. All cables may be fiber cable to reduce possible interference and increase reliability.

The Encryption/Decryption Engine

The encryption/decryption engine 450 secures the transport of data by encrypting each single data packet before it leaves the multi-tenant unit 410 as well as decrypting each data packet of incoming traffic. In one embodiment, the engine 450 uses an additional processor (not shown) to increase data throughput since the encryption/decryption function is quite computation intensive. The encryption/decryption mechanism uses publicly available standards such as RSA, DES and the like. (Bruce Schneier, *Applied Cryptography: Protocols, Algorithms and Source in C* (John Wiley & Sons, 1996), describes in detail various encryption standards. Schneier is incorporated herein by reference.) Encryption/decryption may be enabled or disabled for each of the ports 420–424.

The Ethernet Switch

In one embodiment, a standard high-speed Ethernet protocol enables a computer or LAN 441–444 to connect to the Internet 430. The Ethernet switch 460 directs the traffic among the ports 420–424 based on Ethernet and IP addresses. This approach eliminates the conventional need for a CSU/DSU for speeds from 56 kbps up to 100 Mbps. For lower speeds, the 100 Mbps Ethernet may be throttled down to a bandwidth of 56 kbps within the invention. Thus, one single connector and one single protocol can be used to access a public network like the Internet at variable, controllable speeds, e.g., from 56 kbps up to 100 Mbps. In one embodiment, the bandwidth can be set from 1 kbps to 100 Mbps in 1 kbps increments, offering wide-ranging flexibility.

Figure 7:
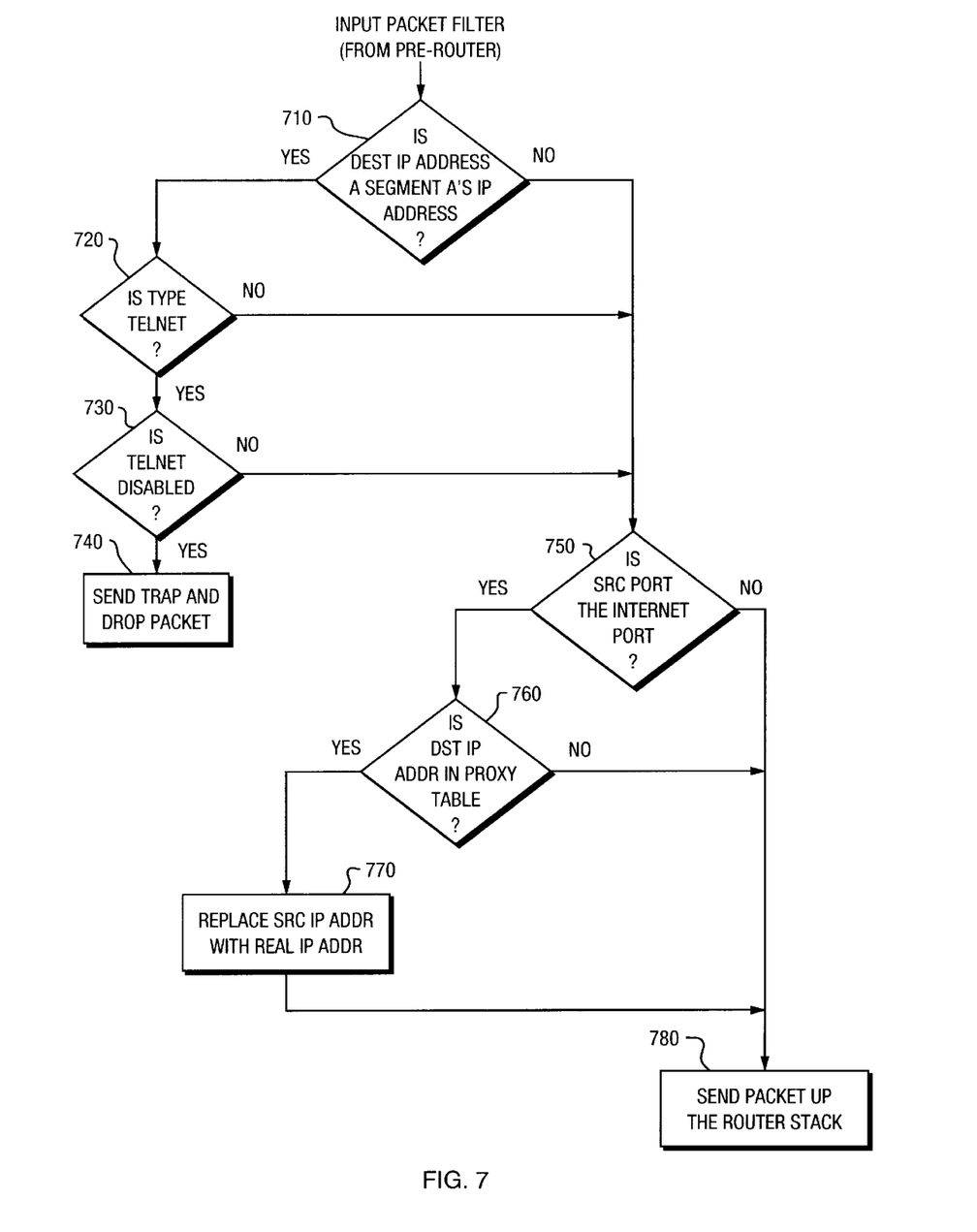
FIG. 7 is a flowchart of a software packet filtering process according to an embodiment of the invention.
Figure 8A:
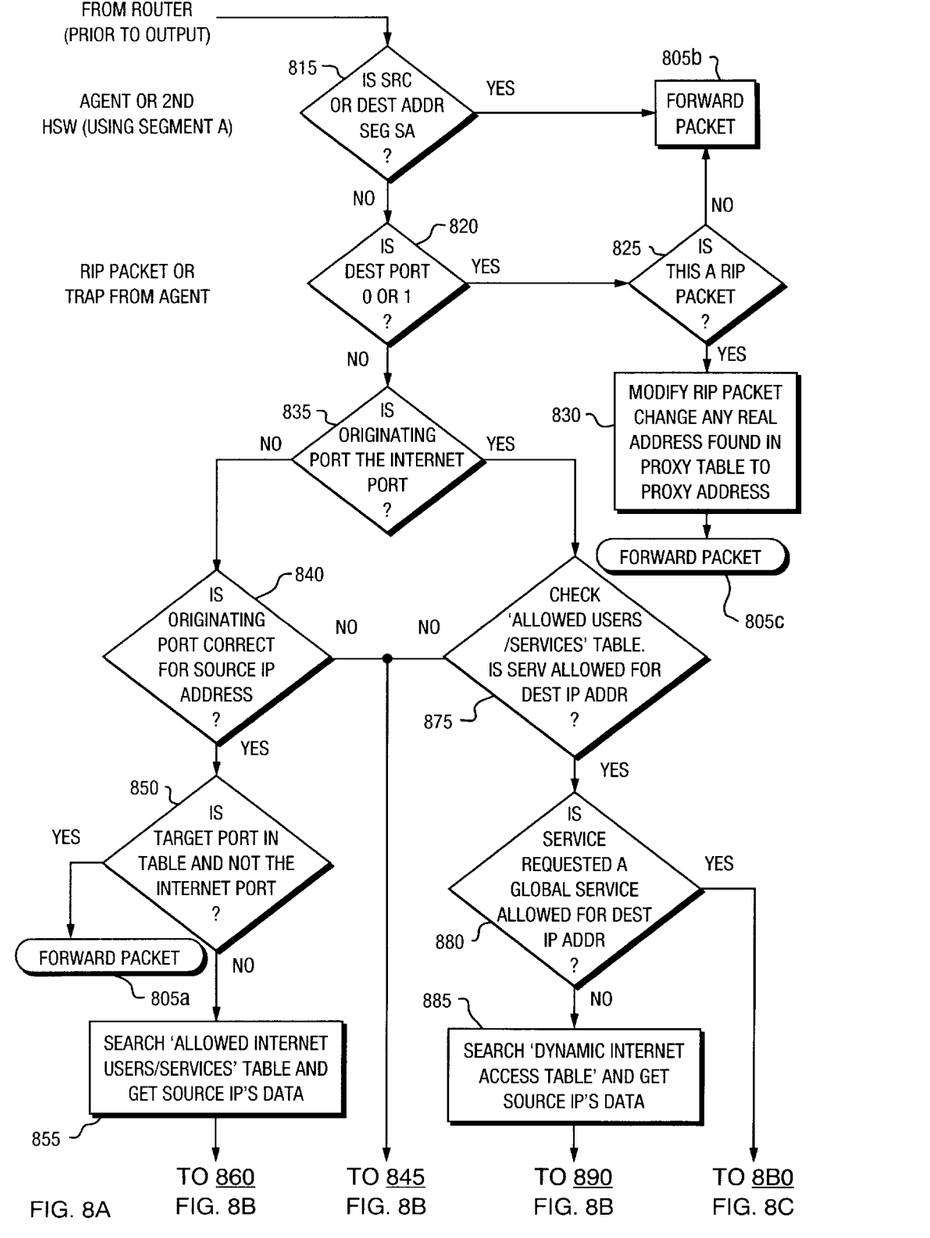
FIGS. 8A and 8B are flowcharts of a process for forwarding packets through the system according to an embodiment of the invention.
Figure 8B:
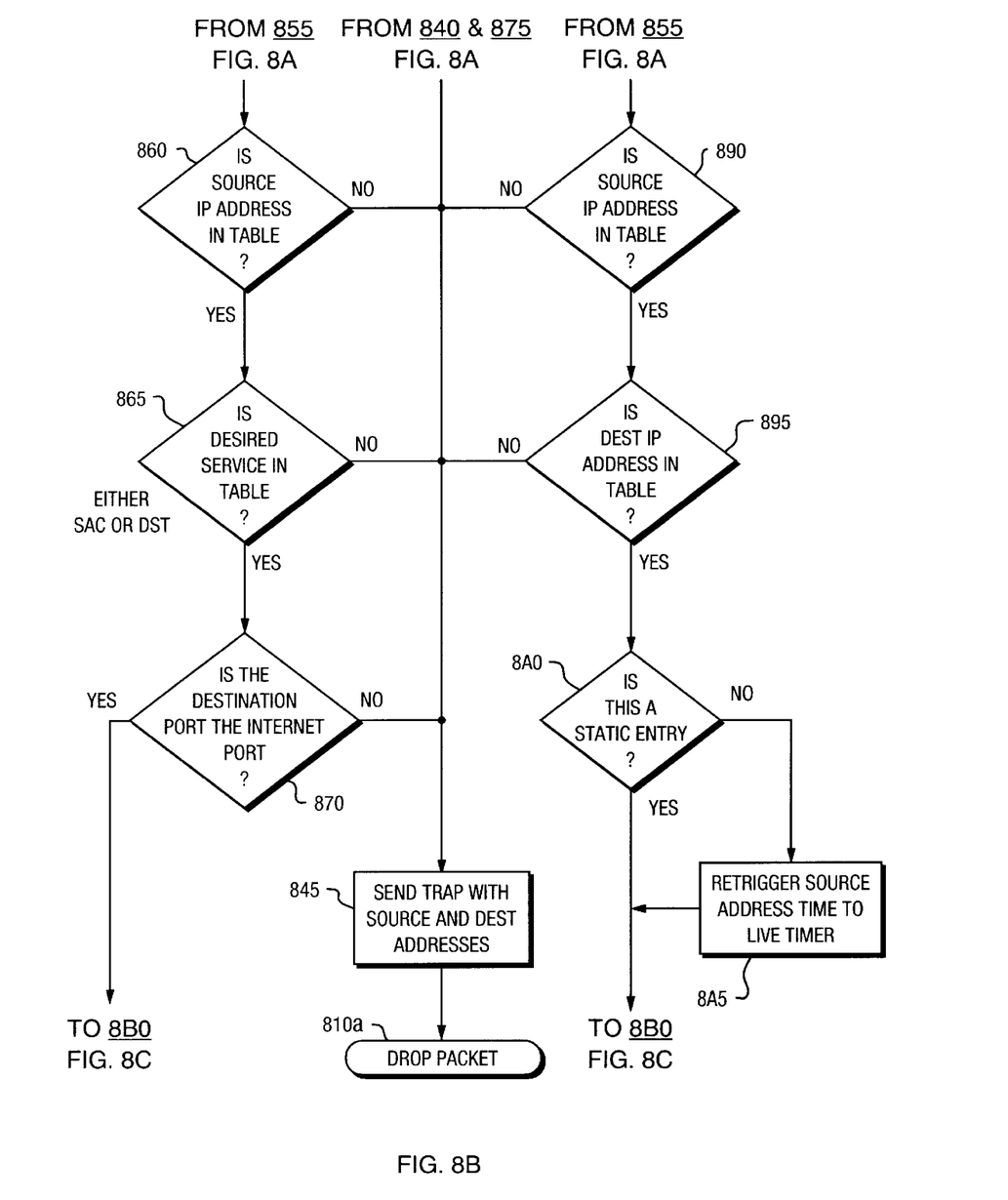
Figure 8C:
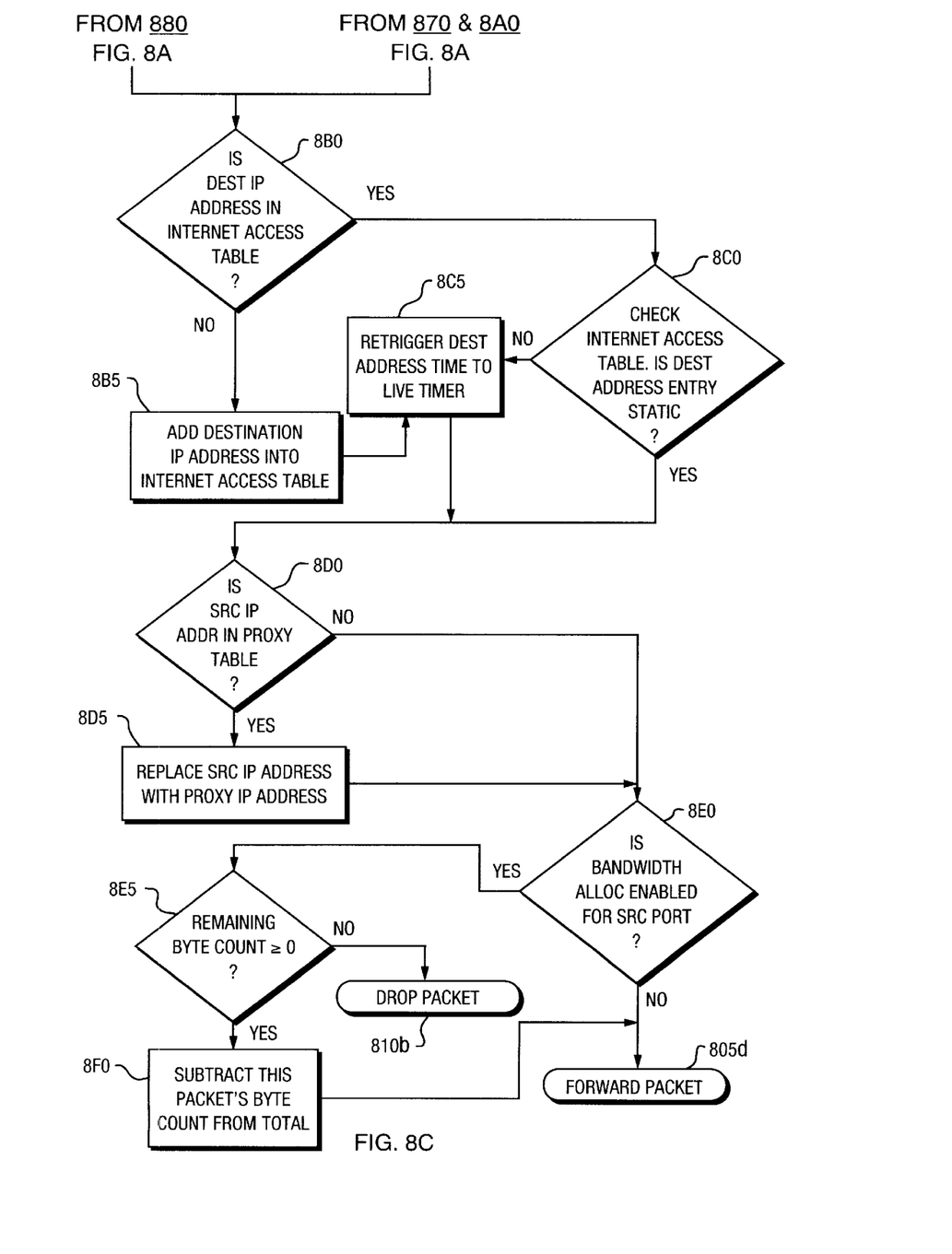

FIGS. 7, 8A and 8B further describe the controls provided by the ethernet switch.

The Firewalls

In one embodiment, the security feature of a firewall is an additional software option, independently securing each user port. The firewall controls the network traffic based on IP address and software services. Access through the firewall is permitted if the service used (File Transfer Protocol (FTP), Hyper-Text Transfer Protocol (HTTP), Simple Mail Transfer Protocol (SMTP), etc.) is enabled and the IP address for incoming or outgoing data is stored in an appropriate table. All parameters of the firewall may be managed using the standard Simple Network Management Protocol (SNMP) together with an extension of private data exchange Management Information Base.

FIGS. 7, 8A and 8B further describe the controls provided by the firewall.

The Unit Enclosure

The unit enclosure 410 may contain the enhanced Ethernet switch 460 as well as all external cable connectors (not shown) in order to disable unsolicited access to the box. This approach ensures that all physically accessible parts are within the box 410 and thus protected from unauthorized use. In one embodiment, each unit 410 serves up to 11 different ports/customers 441–444.

Figure 5:
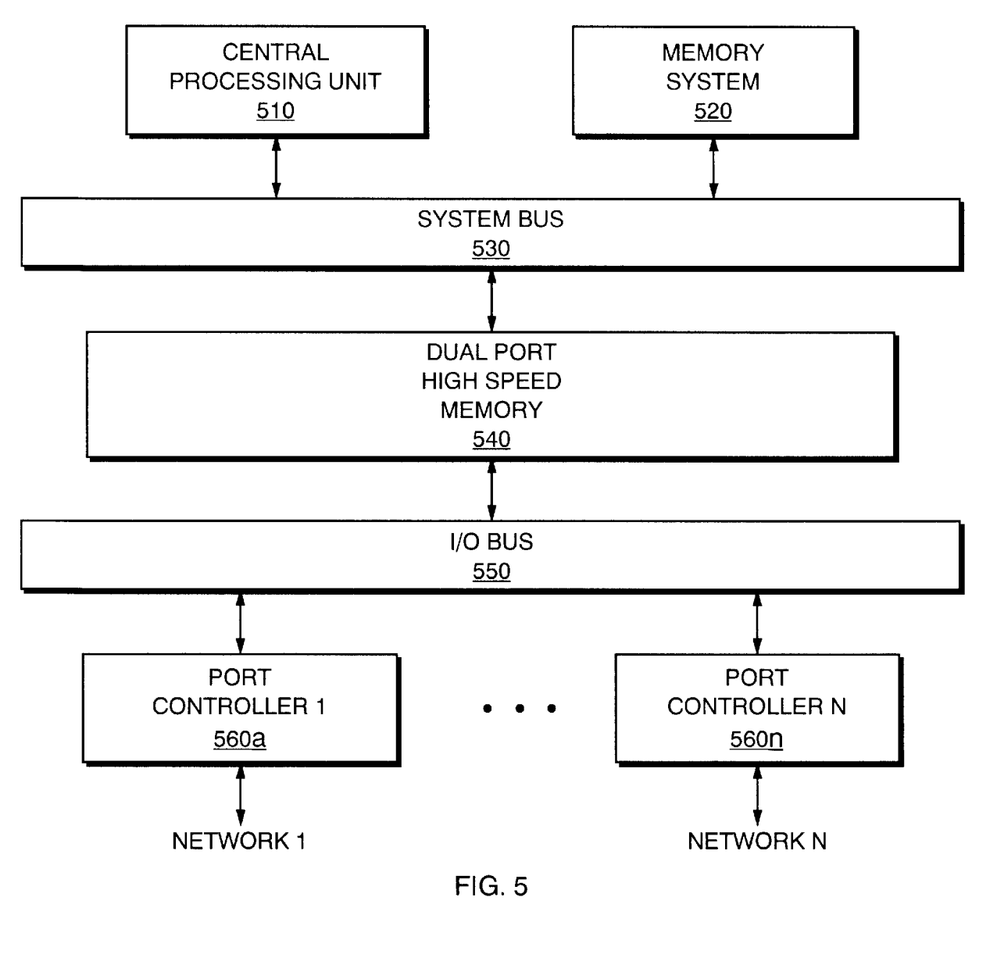
FIG. 5 illustrates a hardware block diagram of an embodiment of the invention.

FIG. 5 illustrates a hardware block diagram of an embodiment of the invention. As shown, a central processing unit 510 and memory system 520 are coupled to a system bus 530. A dual port high-speed memory 540 is situated between the system bus 530 and an I/O bus 550. A port controller for the network and multiple port controllers for the users 560 are coupled to the I/O bus 550.

In one embodiment, the central processing unit 510 is a 32-bit RISC processor (e.g., Advanced Micro Devices AM29240 operating at 20 Mhz). The memory system 520 includes 2 or 4 Mb dynamic RAM (e.g., Texas Instruments TMS45160) as memory; 256 kb high-speed static RAM (e.g., Motorola MC6206) for cache; 64 kb electrically erasable PROM (e.g., Atmel AT28C256) for configuration information like IP addresses, serial numbers of equipment, bandwidth allocation for users, and service information (encryption/decryption and firewall); and 1 Mb flash PROM (e.g., Advanced Micro Devices AM29F040) for the software program.

The network ports 560 may be a serial communication adaptor (e.g., Hitachi HD64570) for connecting to the WAN and 10Base-T (e.g., National DP83932 SONIC, DP883934 SONIC-T) or 100Base-T (e.g., National DP83810 MAC, DP82840 CAT5Phy, DP83223 Twister) for the user ports.

Figure 6:
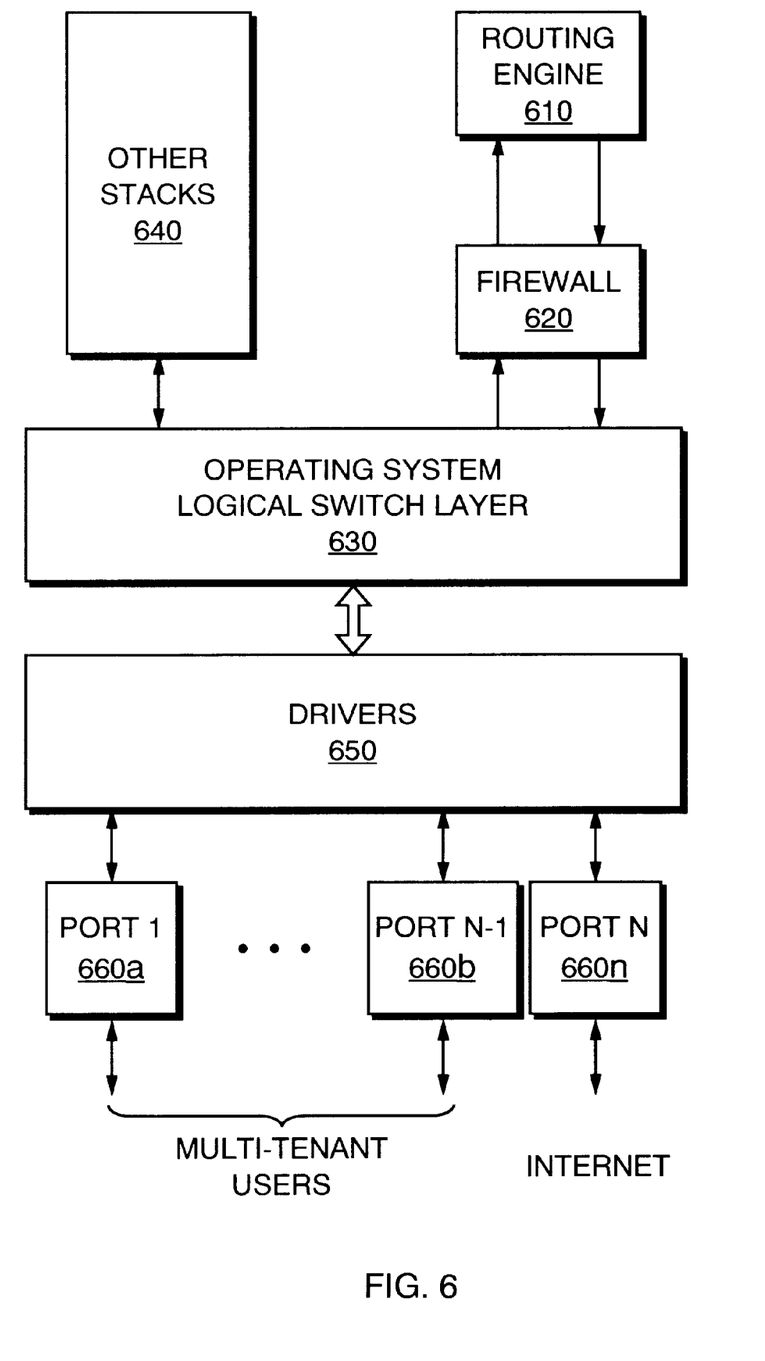
FIG. 6 illustrates a software block diagram of an embodiment of the invention.

FIG. 6 illustrates a software block diagram of an embodiment of the invention. A routing engine 610 communicates through a firewall 620 to the operating system logical switch layer 630. Other stacks 640 also communicate with the operating system logical switch layer 630. The operating system 630 communicates with drivers 650 that communicate over the different ports 660.

FIG. 7 is a flowchart of a software packet filtering process. The goal of the filtering process is to send a packet up the router stack (step 780) or to drop it (step 740), depending on certain conditions.

If the destination IP address of the packet is the internal network of the processor executing the filtering process, then the processor checks whether the service requested is telnet (step 720) and whether telnet service is enabled (step 730). Where the service is not telnet or the telnet service is enabled, the filtering process continues as described in the next paragraph. Otherwise, the processor notes an error condition and drops the packet (step 740).

Where the destination IP address of the packet does not identify the internal network of the filtering process (step 710) or the requested telnet service is enabled (steps 720, 730), the processor determines whether the source port is a port connected to the Internet (step 750) or the destination IP address is in the proxy table. If either condition is determined to be not true, the processor sends the packet up the router stack (step 780) (FIGS. 8A and 8B).

If both conditions are determined to be true, the processor replaces the source IP address with the real IP address and sends the packet up the router stack (step 780).

FIGS. 8A and 8B are flowcharts of a process for forwarding packets through the system. The goals of the packet forwarding process are to either forward a packet (steps 805) or to drop it (steps 810), depending on conditions as described herein.

If the source or destination address of the packet identifies the internal network to which the processor executing this forwarding process connects (step 815), the processor forwards the packet to that network (step 805b). Otherwise, if the destination port of the packet is zero (0) or one (1) (step 820), the forwarding processor checks whether the packet is a Routing Information Protocol (RIP) packet (step 825). If the packet is routing information, the forwarding processor modifies the packet, changing any real address found in the proxy table to the corresponding proxy address (step 830).

Where the destination port of the packet is not zero (0) or one (1) (step 820), the forwarding processor determines whether the port of origin is the Internet port (step 835). If it is not, the forwarding processor checks whether the originating port is correct for the source IP address in the packet (step 840). If it is not, the forwarding processor notes an error condition with respect to the source and destination addresses (step 845) and drops the packet (step 810a).

Where the originating port is correct for the source IP address (step 840) and the target port both is in the table and is not the Internet port (step 850), then the processor forwards the packet (805a). Where the target port is either not in the table or is an Internet port, the forwarding processor searches a table of allowed Internet users and respective services to get the corresponding source IP data for the packet (step 855).

If the source IP address or the desired service is not in the table (steps 860, 865) or if the destination port is not the Internet port (step 870), the forwarding processor notes an error condition with respect to the source and destination addresses (step 845) and drops the packet (step 810a). However, where the source IP address and the desired service are both in the table (steps 860, 865) and where the destination port is the Internet port (step 870), the forwarding process continues from point B, described below.

Where the forwarding processor determines the port of origin to be the Internet port (step 835), it checks the table of allowed users and services to determine whether the requested service is allowed for the destination IP address (step 875). If the service is not allowed for the address, the forwarding processor notes an error condition with respect to the source and destination addresses (step 845) and drops the packet (step 810a).

However, where the service is allowed for the address (step 875), the processor checks whether the requested service is a global service allowed for the destination IP address (step 880). If so, the processor continues at point B, described below.

Where the requested service is not a global service allowed for the destination IP address (step 880), the forwarding processor searches the Dynamic Internet Access table and gets the data for the source IP (step 885).

If the source or destination IP address is not in the table (steps 890, 895), the processor notes an error condition with respect to the source and destination addresses (step 845) and drops the packet (step 810a).

Where the source and destination IP addresses are in the table (steps 890, 895), the processor checks whether the entry is static (step 8A0). If it is static, the process continues from point B, described below. If it is not static, the processor re-triggers the source address time-to-live timer (step 8A5) and continues from point B, described below.

At point B, the forwarding processor determines whether the destination IP address is in the Internet access table (step 8B0). If it is not, the processor adds the destination IP address into the table and re-triggers the destination address time-to-live timer (step 8C5).

Where the destination IP address is in the Internet access table (step 8B0), the processor checks whether the entry is static (step 8C0). If the entry is not static, the processor re-triggers the destination address time-to-live timer (step 8C5).

Where the entry in the Internet access table is static (step 8C0), the forwarding processor determines whether the source IP address is in the proxy table (step 8D0). If it is, the processor replaces the source IP address with the corresponding proxy IP address (step 8D5).

Regardless of whether the source IP address is in the proxy table, the processor checks whether the bandwidth allocation enabled bit is set for the source port (step 8E0). If it is not, the processor forwards the packet (step 805d).

Where the port has an allocated bandwidth (step 8E0), the processor checks whether the count of bytes remaining within the allocated bandwidth is greater than zero (step 8E5). Where the count is not greater than zero, the processor drops the packet (step 810b). (The standards protocols will arrange for the dropped packet to be resent.) Where the count is greater than zero (step 8E5), the processor subtracts the byte count of this packet from the remaining byte count (step 8F0) and forwards the packet (step 805d).

Thus, with the invention, each user port may be allocated a specified bandwidth for data communication. The bandwidth is typically measured in bytes per given time interval. In one embodiment, a counter for a respective user port indicates the number of bytes that may be sent to or from the user port in the interval. Each time a package passes through the invention, the counter for the specific user port is decremented by the number of bytes in the packet. The counter is reset every time interval.

In the configuration information, a Bandwidth Alloc Enabled bit indicates whether a user port specified by a packet has an allocated bandwidth. If it does, the counter for the user port is analyzed to determine if it is greater than or equal to zero, indicating the user port has some available bandwidth in this time interval. With available bandwidth, the counter is decremented by the number of bytes in the packet and then the packet is forwarded to the indicated address.

If there is no available bandwidth for the specified user port, the packet will be dropped. The packet will be resent according to well known networking techniques.

The invention provides a new apparatus and method of establishing respective network connection between a WAN and each of a plurality of tenant sites in a building to allow information packets to be communicated between each tenant site and the WAN. A central switching apparatus like the one described above may be placed in the building. The apparatus includes multiple tenant ports and an additional network port. The WAN may be coupled to the network port and at least one computer or LAN at each tenant site to a respective tenant port. The central switching apparatus establishes communication paths between each tenant port and the network port to provide each tenant with access to the WAN.

Accordingly, a new infrastructure architecture to connect to the Internet is provided. Compared to the conventional approaches for connecting to the Internet with a dedicated line, the invention:

reduces the number of components needed;

reduces the amount of layer 1, 2 & 3 protocols (OSI model) needed;

reduces the complexity of installation; and eases maintenance.

It is believed that the invention is the first to provide the following in a single box:

an Ethernet switch;

fiber cable connectors;

a firewall for data security;

an encryption engine;

remote configuration capabilities;

remote monitoring features; and dual power supplies.

With these features, a customer can tailor the number of users connected to the Internet and the type of service each user receives. Thus, a corporate user may acquire a basic Internet connection (i.e., e-mail and Web) for just one computer at a very low price.

As the invention uses few to no moving parts, a service center (not shown) can remotely manage 97 to 99% of all anticipated service requests. Additionally, the service center can remotely monitor, manage and control all components. Software and control functions can be monitored via the network connection or out-of-bound access via a dial telephone line. SNMP can exchange information between the service center and the unit.

The invention provides dedicated service at a lower operational cost. Accessibility to networks improves by:

lowering the entry cost for an Internet connection;

providing a high-capacity connection at a low ongoing cost;

fully monitoring and managing the network 24 hours a day; and providing a completely integrated Internet hook-up service.

A unit may include a modified OFFICEStak® master enclosure available from the assignee of the instant invention.

In one embodiment, a new cover provides secure access to all cables that plug-in to the unit either from the front or rear of the enclosure. This new cover has a front and back door assembly that is removed in order to obtain access to any cables. Any opening of the door is sensed and transmitted to the Network Management System via an operating system interrupt mechanism.

A master secure enclosure incorporates a modified dual power supply assembly. This assembly houses two sensors—one to detect access to the rear cables and one to detect access to the front cables.

The unit may be configured with one or two High Speed Switching Module 4 (HSM4) modules. These high speed switching modules provide four on board 10base-FL switched fiber ports. The unit may configurable with twelve 10Base-FL switched Ethernet ports. One as the Internet access port and the remaining eleven as user ports.

Each HSM4 also has an on-board socket for upgrading with an Encryption Processor Module (EPM). The HSM4 is derivative of two existing printed circuit boards—the HSM3 and Fiber I/O modules.

The unit may be configured with an integral dial-in modem for out-of-band management access. A plug-in modem card operates either in "dial-in mode" or a direct "by-pass mode" when a management PC is locally attached.

The unit may be designed so that no local configuration will be required. Software enhancements may include BOOTP and SNMP security via Community String (password) one-time password algorithm. The remote monitoring (RMON) capability may be adapted from the OFFICEStak® MultiSegment hub probe. This RMON probe is dynamically switched to any internal hub segment via SNMP command. The probe supports all groups of RMON.

This enhancement allows remote monitoring of any switched Ethernet port with a single RISC processor-based probe. This capability enables a network administrator to send an SNMP command to the RMON probe and have it dynamically switch to any one of multiple Ethernet switched ports.

In one embodiment, an Encryption Processor Module (EPM) uses a RISC processor and fast memory with dynamic memory access (DMA) to the HSM4. In this way, the EPM functions as a co-processor to the HSM4 to which it is connected. The EPM supports several cryptographic algorithms, e.g., DES CBC modes (56 key bits), DESX (184 key bits), Triple DES (up to 168 key bits), and RC2, RC4, or RC5. Key negotiation support can be available using the Diffie-Hellman key negotiation algorithm.

Using an RSA code as a base enables the EPM to operate in a mode compatible with almost any implementation communicating in SSL, S/HTTP, SEPP, STT, S/MIME, S/WAN, IPSec or PCT. Designing the EPM with a RISC processor provides the flexibility to configure units with different algorithms as may be required.

In conclusion, the present invention provides systems and methods for providing multiple users with access to a public network like the Internet. While the above includes a description of a specific embodiment of the invention, various modifications, alternative constructions, and equivalents may be used. Therefore, the above description should not be taken as limiting the scope of the invention as defined by the claims.

What is claimed is:

1. An apparatus for communicating information packets between each of a plurality of user ports and a network port, the apparatus comprising:

a switch for establishing communication paths between each of the user ports and the network port;

storage for configuration information regarding the user ports including, a bandwidth allocated to each user port and including security features for each user port;

a controller, responsive to the configuration information for a given user port, for limiting the flow of information packets in a given time interval between the given user port and the network port corresponding to the bandwidth allocated to each user port; and a firewall, responsive to the configuration information for the given user port, for filtering network traffic to the given user port corresponding to the security features for that user port.

2. The apparatus of claim 1, wherein:

the controller for limiting operates to pass a maximum number of information packets in a given time interval, and, once during the given time interval, to drop subsequent information packets that appear during the given time interval.

3. The apparatus of claim 2, wherein the bandwidth is in a range of 1 kbps to 100 Mbps.

4. The apparatus of claim 1, wherein:

the configuration information for the given user port is information regarding a type of service specified for the given user port; and the controller for limiting operates to pass only information packets meeting a given criterion consistent with the type of service specified for the given user port, and to drop information packets that are not consistent with the type of service specified for the given user port.

5. The apparatus of claim 1, wherein:

the storage includes a non-volatile computer memory; and the controller for limiting comprises a computer processor, coupled to the non-volatile computer memory and programmed to implement a procedure for limiting the flow of information packets.

6. The apparatus of claim 1, wherein each of the user ports comprises an Ethernet controller.

7. A method for distributing data between a network port and a plurality of user ports, the method comprising the steps of:

storing configuration information, indicating data bandwidth allocated to each of the user ports and indicating security features of each of the user ports;

receiving a request to send data between the network port and the selected user port if the current data bandwidth is less than the allocated data bandwidth;

filtering data sent between the network port and the selected user port based on the security features of the selected user port;

determining if the current data bandwidth of the selected port exceeds the allocated data bandwidth according to a counter measuring the number of bytes of data in a given time interval; and sending the filtered data between the network port and the selected user port if the counter indicates that the current data bandwidth is less than the allocated data bandwidth.

8. The method of claim 7, further comprising the step of not sending the data to the selected user port if the current data bandwidth is greater than or equal to the allocated data bandwidth.

9. The method of claim 7, wherein the determining step includes the step of determining that the current data bandwidth of the selected user port has exceeded the allocated data bandwidth if the counter is less than zero.

10. The method of claim 7, further comprising the step of decrementing the counter for each byte specified in request to send data if the current data bandwidth of the selected user port has not exceeded the allocated bandwidth.

11. The method of claim 10, further comprising the step of allocating data bandwidth to a user port in the range of 1 kbps to 100 Mbps.

12. The method of claim 7, wherein the step of sending the data includes sending data from the network port to the selected user port.

13. The method of claim 7, wherein the step of sending the data includes sending data from the selected user port to the network port.

14. The method of claim 7, further comprising the step of remotely defining the configuration information.

15. A method of establishing respective network connections between a wide area network (WAN) and each of a plurality of tenant sites at a single location to allow information packets to be communicated between each tenant site and the WAN, the method comprising the steps of:

providing a central switching apparatus at the location, the apparatus including a plurality of tenant ports, and a network port;

storing configuration information including security information for each tenant at the central switching apparatus;

coupling the WAN to the network port;

coupling at least one computer or a local area network (LAN) at each tenant site to a respective tenant port;

establishing, with the central switching apparatus, communication paths between each tenant port and the network port to provide each tenant with access to the WAN, and filtering, with the central switching apparatus, data sent between the network port and each tenant port based on the security information for each tenant port.

16. The method of claim 15, and further comprising the steps, carried out for each tenant, of:

storing configuration information germane to that tenant; and using that tenant's configuration to limit, according to a particular criterion, information packets that are allowed to travel between that tenant's site and the WAN.

* * * * *

UNITED STATES PATENT AND TRADEMARK OFFICE
CERTIFICATE OF CORRECTION

PATENT NO : 6,144,638
DATED : November 7, 2000
INVENTOR(S) : Thomas Obenhuber, et al.

It is certified that error appears in the above-identified patent and that said Letters Patent are hereby corrected as shown below:

Col. 9, line 55
replace "and, once during the given time interval,"
with --and, once the maximum number of information packets has passed during the given time interval, --

Signed and Sealed this

Eighth Day of May, 2001

Attest:

NICHOLAS P. GODICI

*Attesting Officer*    *Acting Director of the United States Patent and Trademark Office*